(12) United States Patent
McGhee et al.

(10) Patent No.: US 8,035,031 B2
(45) Date of Patent: Oct. 11, 2011

(54) DATA TRANSMISSION

(75) Inventors: Stephen McGhee, Isle of Man (GB); Alfred Jones, Isle of Man (GB); Matthew Patrick, Isle of Man (GB)

(73) Assignee: Manx Electricity Authority, Douglas (IM)

( * ) Notice: Subject to any disclaimer, the term of this patent is extended or adjusted under 35 U.S.C. 154(b) by 617 days.

(21) Appl. No.: 11/912,841

(22) PCT Filed: Apr. 28, 2006

(86) PCT No.: PCT/GB2006/001549
§ 371 (c)(1),
(2), (4) Date: Jul. 23, 2008

(87) PCT Pub. No.: WO2006/114636
PCT Pub. Date: Nov. 2, 2006

(65) Prior Publication Data
US 2008/0289848 A1     Nov. 27, 2008

(30) Foreign Application Priority Data
Apr. 28, 2005   (GB) .................................. 0508673.1

(51) Int. Cl.
H02G 15/064    (2006.01)
(52) U.S. Cl. ..................................... 174/71 C; 174/73.1

(58) Field of Classification Search ................ 174/71 C, 174/73.1; 340/310.11–310.18; 333/101, 333/24
See application file for complete search history.

(56) References Cited

U.S. PATENT DOCUMENTS

| | | | | |
|---|---|---|---|---|
| 5,856,776 | A | 1/1999 | Armstrong et al. | 11/4 |
| 7,046,124 | B2 * | 5/2006 | Cope et al. | 375/258 |
| 7,248,148 | B2 * | 7/2007 | Kline et al. | 375/258 |
| 7,307,512 | B2 * | 12/2007 | Yaney et al. | 340/12.39 |
| 2006/0022786 | A1 | 2/2006 | Layton | 366/132 |

FOREIGN PATENT DOCUMENTS

| | | | |
|---|---|---|---|
| CN | 1534691 | 10/2004 | ............ 7/17 |
| EP | 0978952 | 2/2000 | |
| GB | 528311 | 10/1940 | |
| GB | 2019668 | 10/1979 | |
| JP | 2-129129 | 10/1990 | |
| JP | 6-215638 | 8/1994 | |
| WO | WO 2005/008913 | 1/2005 | |

* cited by examiner

Primary Examiner — William H Mayo, III
(74) Attorney, Agent, or Firm — O'Shea Getz P.C.

(57) ABSTRACT

A system for data transmission over an electricity distribution network. The system having an electrical apparatus having a shielded cable connected thereto. The cable has a core surrounded by a metallic sheath and armour surrounding the metallic sheath, wherein the armour is disengaged from around the metallic sheath at a position where the cable enters the apparatus and is supported relative to the apparatus at a position spaced from that position such that a portion of the metallic sheath is exposed.

25 Claims, 5 Drawing Sheets

DATA TRANSMISSION

This application is entitled to the benefit of, and incorporates by reference essential subject matter disclosed in PCT Application No. PCT/GB2006/001549 filed on Apr. 28, 2006 and Great Britain Application No. 0508673.1 filed on Apr. 28, 2005.

BACKGROUND OF THE INVENTION

1. Technical Field

The present invention relates to data transmission, and in particular to data transmission over an electricity distribution network.

2. Background Information

Electricity distribution networks are extensively used to transmit electricity from electricity generating stations, such as power stations, to domestic and industrial consumers. It has been realised that the electricity distribution network provides an infrastructure connecting thousands of consumers which can be used to transmit more than just electricity. For example, the distribution network can be used for the transmission of data.

Existing systems in which the electricity distribution network is used to transmit data are called 'Power Line Communications' (PLC) and 'Broadband over Power Lines' (BPL). In these systems a high frequency data signal is added, or inserted, onto an electrical power cable using an inductive coil or capacitor arranged around or near the cable. A corresponding inductive coil or capacitor is then used to remove, or extract, the data signal at the other end. These systems allow a data signal to be transmitted between two parties over an existing power cable without the need for a separate data communication infrastructure. Furthermore, the transmission of data does not interfere with the primary use of the cable, that is to transmit electricity.

There are however a number of problems associated with implementing PLC on existing electricity distribution networks, particularly where the infrastructure is old or where the parts are inaccessible.

In many parts of a distribution network (such as high voltage overhead power cables) the electrical cables are completely exposed or are coated with a thin protective layer or sheath. In these situations, access to the cables is largely unhindered and as a result data can be injected onto the cable easily using a small inductive coil. However, there are many parts of a network in which the cables are shielded for insulation and/or protection purposes such as shielded cables used in underground applications. Shielded cables typically comprise a core which carries the power and which is surrounded by a metallic sheath and a series of mild steel windings or tape (referred to as armour) running around and along the length of the cable. In situations where cables are shielded, large inductive coils or capacitors are needed to inject the data signal through the cable shield and to the conductive cores of the cable. It is of course possible to use large inductive coils to inject a data signal through the shield but installation and mounting of these coils on existing cables has made their use commercially unviable. Furthermore, the quality of the data signal which can be injected onto or extracted from a shielded cable can be diminished due to the cable shield and armour configuration.

The problems of using armoured cables in PLC applications is a limiting factor wherever access to the cable core is required to inject or extract a data signal. For example, PLC networks often require repeaters to 'boost' the signal strength where the signal is required to travel over extended distances. Again, armoured cables mean that access to cable cores to inject the signal requires a substantial increase in the cost of PLC repeaters.

The problems discussed above also arise when an electrical cable is connected to apparatus such as transformers, termination boxes and the like. In these situations the cables are shielded (using mild steel armour) for safety purposes. In a conventional connection of a shielded electrical cable to a termination box, the shielding of the cable is mechanically coupled to the termination box by a mechanical clamp. The clamp grips the steel armour to mechanically support the cable against the termination box housing and prevents the cable pulling away from the termination, box, also electrically bonding the armours to the potential of the metallic shield. The cores of the cable, which are surrounded by the armour and insulation, feed directly into the termination box thereby providing the required electrical path.

Because termination boxes are often sealed and inaccessible the only way to implement PLC in these situations is to install an inductive coil around the shielded cable before the cable enters the termination box.

In general, the use of shielded cables with inaccessible cable boxes within an electricity distribution network restricts access to the cable cores and makes the implementation of PLC to these parts of the network difficult and expensive. One option to overcome the problems of implementing PLC with shielded cables is to replace each, of the transformers or termination boxes with an equivalent which provides access to the cable core. However, it will be appreciated that the cost of replacing transformers and termination boxes in an electricity distribution network is both disruptive to the electricity supply and extremely expensive.

There is therefore a need for apparatus which allows PLC to be implemented on an existing distribution network in which shielded cables are used without the need for substantial modifications to the equipment. Specifically, there is a need for apparatus which removes the requirement for large and expensive network modifications and which does not compromise the electrical safety or the mechanical integrity of the connection.

DISCLOSURE OF THE INVENTION

From a first aspect, therefore, the invention provides an electrical system comprising an electrical apparatus and a shielded electrical cable connected to said apparatus, said cable having a core, a metallic sheath around the core and a surrounding armour; wherein said armour is disengaged from around said metallic sheath at a location where the sheath enters the apparatus, and is supported relative to said apparatus at a position spaced from said location, such, that a portion, of the sheath is exposed between said location and the armour.

With such an arrangement, a portion of the sheath is exposed where the cable enters the apparatus (for example a transformer, switchgear, or a termination box) thereby making the sheath accessible for PLC equipment and components.

Preferably the armour is connected to the apparatus by a coupling which maintains the desired positional relationship between the apparatus and the armour and which may also, depending on the orientation of the apparatus and cable, support the armour on the apparatus.

Preferably the coupling comprises a first end arranged to receive the armour and a second end spaced from, but connected to, said first end, which second end is arranged to be mounted to a part of the apparatus.

The invention also extends to such a coupling and from a second aspect provides a coupling for connecting a shielded electrical cable having a core and surrounding armour to an electrical apparatus, said coupling comprising a first end arranged to receive the armour of the cable and a second end spaced from, but connected to, said first end, which second end is arranged to be mounted to a part of the apparatus.

The second end is connectable to the apparatus in any suitable manner, but preferably it is configured to engage circumferentially around a part of the apparatus, for example the gland of a termination box.

The connection may be fixed, i.e. permanent, or may be releasable such that the coupling can be connected and disconnected.

Preferably, the second end is arranged to clamp circumferentially around a part of the apparatus. It may, therefore, be formed of one or more parts which together extend around the circumference of the part. For example, it may comprise a collar arranged to surround the part, with means to allow the collar to be tightened around the part.

Preferably the collar is formed of two or more components arranged to connect together and to tighten around the part. Each part may comprise flanges to receive tightening means such as tightening bolts.

The first end of the coupling is preferably arranged to clamp the cable armour between two surfaces. The surfaces may be any shape between which the armour can be interposed. Preferably, the clamping surfaces are substantially parallel surfaces and are preferably arranged at an angle to the axis of the cable, most preferably perpendicular to the axis of the cable.

The first end of the coupling is preferably formed of two plates or discs having a central bore sufficiently large to allow the core of the cable to pass therethrough (i.e. a bore diameter at least as large as the diameter of the core of the cable). The plates may engage against one another using any suitable mechanical connection or joint which may be permanent or releasable.

The plates may each be formed of two or more components arranged to connect together to encircle the cable core and to cooperate so as to mechanically secure the cable armour. Preferably the joints between the respective plate components are offset circumferentially from each other.

The coupling preferably comprises one or more connection members extending between the first and second ends of the coupling. The connection member (s) may be a rod or rods, for example. Preferably, three circumferentially spaced connection rods are provided.

The connection member(s) may be provided with means such that the first and second ends can be moved relative to one another along the axis of the cable. In a preferred embodiment a turnbuckle arrangement may be used. This allows a cable to be pulled towards or pushed away from a termination box, in use.

Preferably, electrical insulation is provided between the first and second ends of the coupling. For example, in the turnbuckle arrangement described above, the turnbuckle body may be formed of an insulating material, for example nylon.

The first end of the coupling preferably provides a surface surrounding an exposed length of cable sheath for receiving an inductive component. Preferably, it provides a surface perpendicular to the axis of the cable to receive an inductive component. The inductive component may be any suitable inductor but is preferably an inductive coil.

The invention also extends to apparatus including an inductor, and from a yet further aspect, therefore, provides an electrical system comprising an electrical apparatus and a shielded electrical cable mounted to said apparatus, said cable having a core surrounded by a metallic sheath and by armour; wherein said armour is disengaged from around said sheath at a location where the cable enters the apparatus, such that a portion of the sheath is exposed between said location and the armour, and inductance means arranged around said exposed portion of said sheath.

As discussed above, PLC applications also require the use of repeaters to 'boost' the data signal carried on the shielded cable such that the signal can be transmitted over extended distances. In PLC repeaters a signal is extracted from the cable, amplified and then injected back onto the cable.

Viewed from a further aspect, an invention disclosed herein provides a signal repeater on an electrical cable comprising a current carrying core, a metallic sheath arranged around the core and armour around the metallic sheath, wherein the armour is removed over a length of cable to expose a section of said metallic sheath; a central part of said exposed section of metallic sheath is removed to expose a length of the core and to leave two lengths of sheath projecting from said armour; respective inductors are arranged on said projecting lengths of sheath; and respective earth paths run from respective end regions of said projecting metallic sheath back under said inductors to an external earth path extending between both ends of the repeater, said earth paths being insulated from the respective metallic sheath lengths between the end region of the sheath lengths and their connection to the external earth path.

The break in the metallic sheath breaks the electrical continuity of the sheath along the length of the cable, as is required, because it is thought that the signal may in fact be assisted by being carried on the sheath and the cable core.

Preferably the inductors are coaxial with the cable.

The earth path can be provided by any suitable insulated conductor, but it is preferably provided by an insulated conductive braid connecting the end region of the sheath and passing under the respective inductors, i.e. between the sheath and the inner surface of the inductor.

The external earth path is preferably provided by one or more external conductive members. Preferably, however, it is provided by a conductive cage which surrounds the cable. This provides not only the necessary earth path but also protects the underlying components from accidental damage by cutting, particularly when the repeater is buried underground, as is likely to be the case.

Preferably the inductors are received closely within the cage for support.

The first and second inductors are preferably connected to a data processor arranged to receive an input signal from the first inductor, to amplify the signal and to output the amplified signal to the second inductor.

Thus, with this arrangement the core of the cable is accessible in the repeater thereby allowing a data signal to be easily extracted and injected onto the cable.

Furthermore, the earth path required for the operation of the inductors is maintained.

Viewed from a still further broad aspect, there is provided an electrical conductor having a current carrying core, a metallic sheath arranged around the core and armour around the metallic sheath, wherein the armour is removed over a length of conductor to expose a section of said metallic sheath and an inductor is arranged around the exposed section of metallic sheath.

The electrical cables/conductors disclosed herein may be formed with a single core or, alternatively, may be formed of a plurality of cores. Each core may be formed of any suitable conductive material.

The core or cores may be surrounded by an insulating layer which may be of any suitable material. The core (or cores) may for example be surrounded by a paper insulating layer. In this arrangement when part of the metallic sheath is removed, a length of insulating material surrounding the core is exposed. The cores may be individually surrounded by an insulating layer.

The metallic sheath may be formed of any suitable material. For example, the metallic sheath may be formed of lead.

BRIEF DESCRIPTION OF THE DRAWINGS

Embodiments of the invention will now be described, by way of example only, and with reference to the accompanying drawings in which.

DETAILED DESCRIPTION OF THE INVENTION

Figure 1:
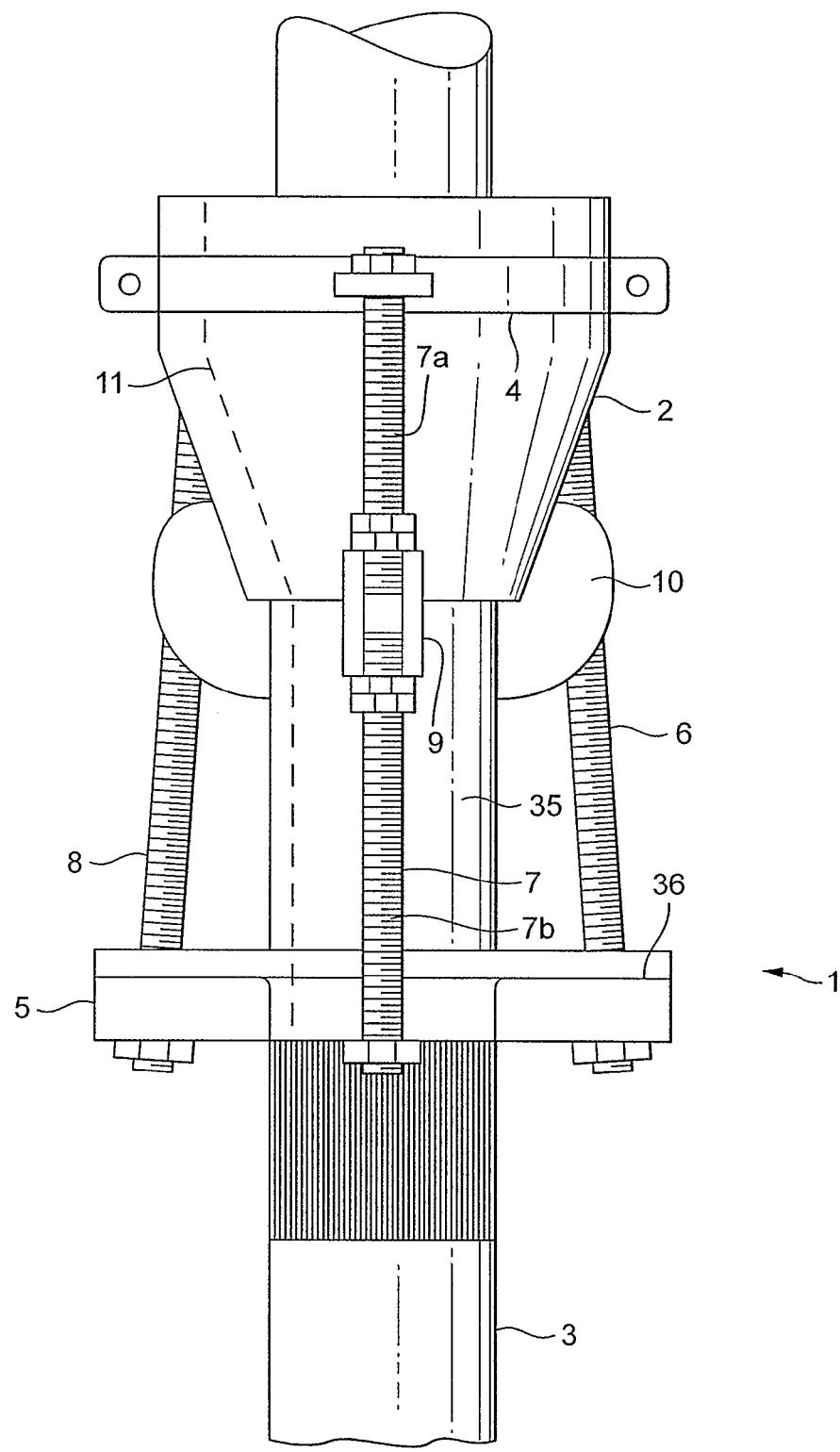
FIG. 1 shows a coupling arrangement according to the present invention.

FIG. 1 shows a coupling according to a preferred embodiment of the present invention. The coupling 1 is arranged to connect the gland 2 of an electrical termination box (not shown) to a three phase 1 lkV shielded electrical cable 3.

The coupling 1 comprises a gland clamp 4, which clamps circumferentially around the gland 2, and an armour clamp 5 which clamps the armour of the cable 3. The gland clamp and the armour clamp are connected by a plurality of connecting rods 6, 7, 8.

Figure 2:
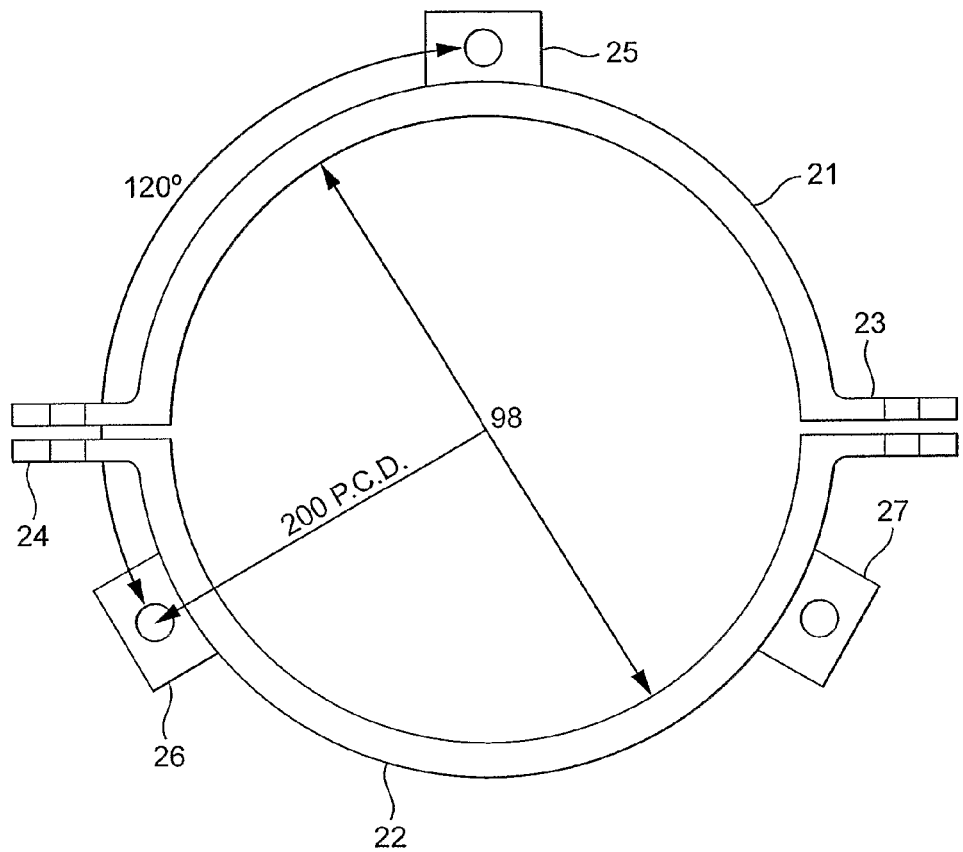
FIG. 2 shows the gland clamp of the coupling of FIG. 1.

With reference to FIG. 2, the gland clamp 2 is formed of 2 semicircular elements 21, 22. Electrical termination box glands have standard diameters and the gland clamp diameter is selected according to the termination box to which the gland will be selected. The gland clamp elements 21, 22 are provided with tightening flanges 23, 24 which allow the gland clamp elements 21, 22 to be arranged around the gland 2 and then bolted together (using bolts not shown) to circumferentially clamp against the gland 2.

The gland clamp elements 21, 22 are further provided with flanges 25, 26, 27 spaced equally around the circumference of the gland clamp 2. These receive the upper ends of the connecting rods 6, 7, 8. The connecting rods are, in this embodiment, formed of M10 threaded bar and connect the gland clamp connection flanges 25, 26, 27 with corresponding connection flanges 49, 50, 51 of the armour clamp 5, as show in FIG. 4B.

The connecting rods 6, 7, 8 are variable in length, each having a turnbuckle 9. The turnbuckle 9 is formed of a cylindrical length of nylon having two threaded bores in either end and which bores are arranged to receive the M10 threads of the connection members 6, 1, 8. The connection rods are each formed of a first portion 7a which extends between the turnbuckle 9 and the gland clamp 4 and a second portion 7b which extends between the turnbuckle 9 and the armour clamp 5. As a turnbuckle 9 is provided on each of the connecting members 6, 7, 8 (only connection element 7 being visible in FIG. 1) the gland clamp 4 is electrically insulated from the armour clamp 5.

Figure 3:
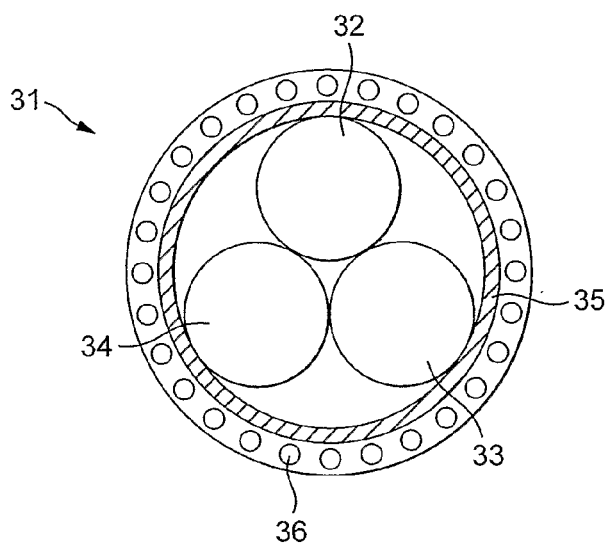
FIG. 3 shows the construction of a conventional 3 phase 1 lkV electricity cable.

The armour clamp 5 is mechanically connected to the armour of the 3 phase shielded cable 3. FIG. 3 illustrates the components of a shielded cable.

A shielded cable 31 as shown in FIG. 3 generally comprises three separate aluminium cores 32, 33, 34 each surrounded by a paper insulating layer (not shown). The 3 cores 32, 33, 34 are surrounded by a lead sheath 35 which acts to protect and support the individual cores. The cable is surrounded by a series of mild steel wires helically wound around and along the length of the cable to form the cable armour 36. The armour 36 acts to shield and protect the cable. The lead sheath 35 and armour 36 are in electrical contact so as to be at the same electrical potential.

FIG. 1 shows the arrangement of the armour 36 and its connection to the armour clamp 5. In assembling the coupling, the armour 36 of the cable 3 is clipped such that the armour 36 can be pulled away from the lead sheath 35. The armour 36 is then pulled away from the lead sheath 35 and bent back so as to lie perpendicular to the axis of the cable 3 as shown in FIG. 1. The armour 36 is then positioned between the armour clamp elements as shown in FIGS. 4A and 4B.

Figure 4A:
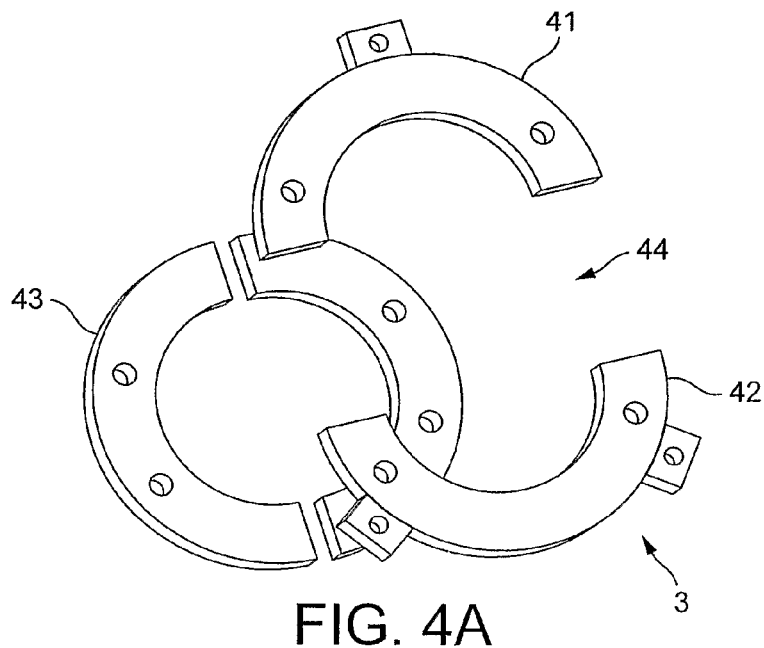
FIGS. 4A and 4B illustrate the armour clamp of the coupling of FIG. 1.
Figure 4B:
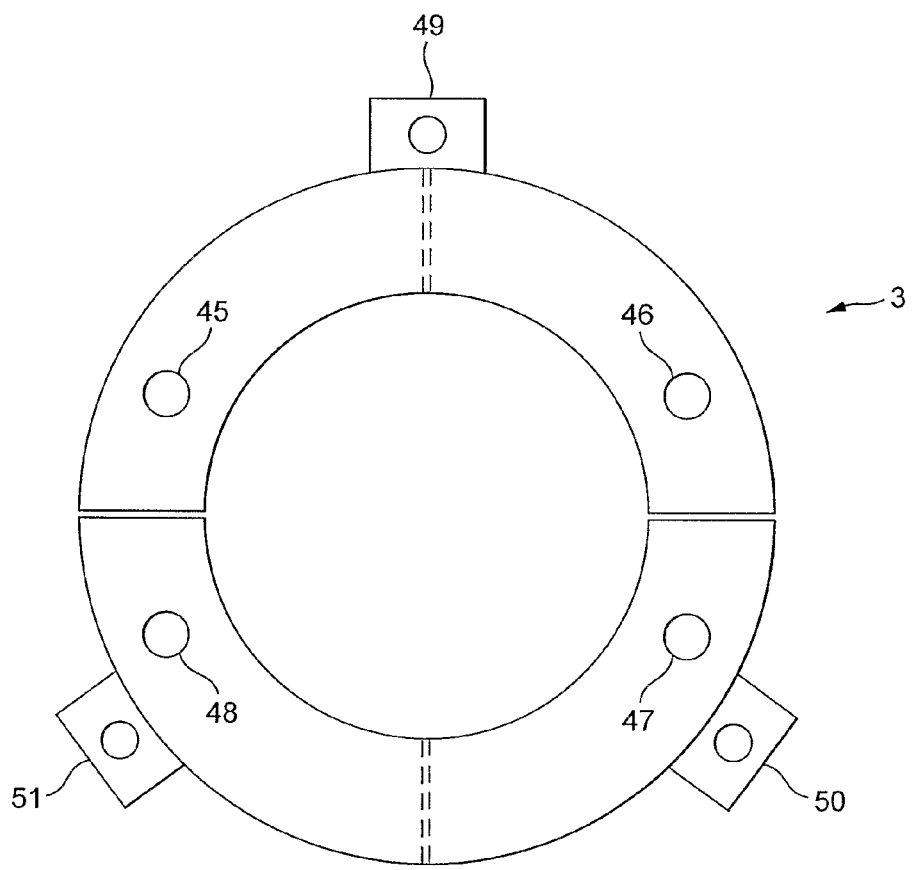

FIG. 4A show the armour clamp 3 which, in the preferred embodiment, is assembled of 4 elements 41, 42, 43, 44. Elements 41, 42, 43, 44 are assembled as shown in the figure in 4A and bolted together using bolt holes 45, 46, 47, 48 as shown in FIG. 4B (in plan view). The armour clamp is also provided with connection flanges 49, 50, 51, as described above.

Once the bent back armour 36 is in position between the 4 armour clamp elements, the armour clamp 5 is tightened up using bolts (not shown) arranged in bolt holes 45, 46, 47, 48 to clamp the cable armour in the armour clamp. The armour 36, and therefore the cable 3, is thereby rigidly connected to the armour clamp 5 as shown in FIG. 1.

Once the armour 36 has been connected to the armour clamp the connection rods 6, 7, 8 can be bolted to the connection flanges of the gland clamp 4 and armour clamp 5 as discussed above. The armour 36 and cable 3 are thereby mechanically supported by the gland 2 thorough the coupling 1.

The lead sheath 35 passes through the centre of the coupling and into the electrical termination box (of which the gland 2 is a part). As shown in FIG. 1 the gland 2 is wiped, or soldered, onto the lead sheath 35 by a wipe 10 which ensures that the gland 2 and lead sheath 35 are at the same electrical potential. This arrangement ensures that the earth path connecting the gland 2 to the cable 3 runs through the centre of coupling via the lead sheath 35 and not via the connecting rods 6, 7, 8. The current carrying core of the cable is connected inside the termination box. The wipe 10 will also provide some mechanical support for the sheath 35 and thus the cable 3.

Figure 5:
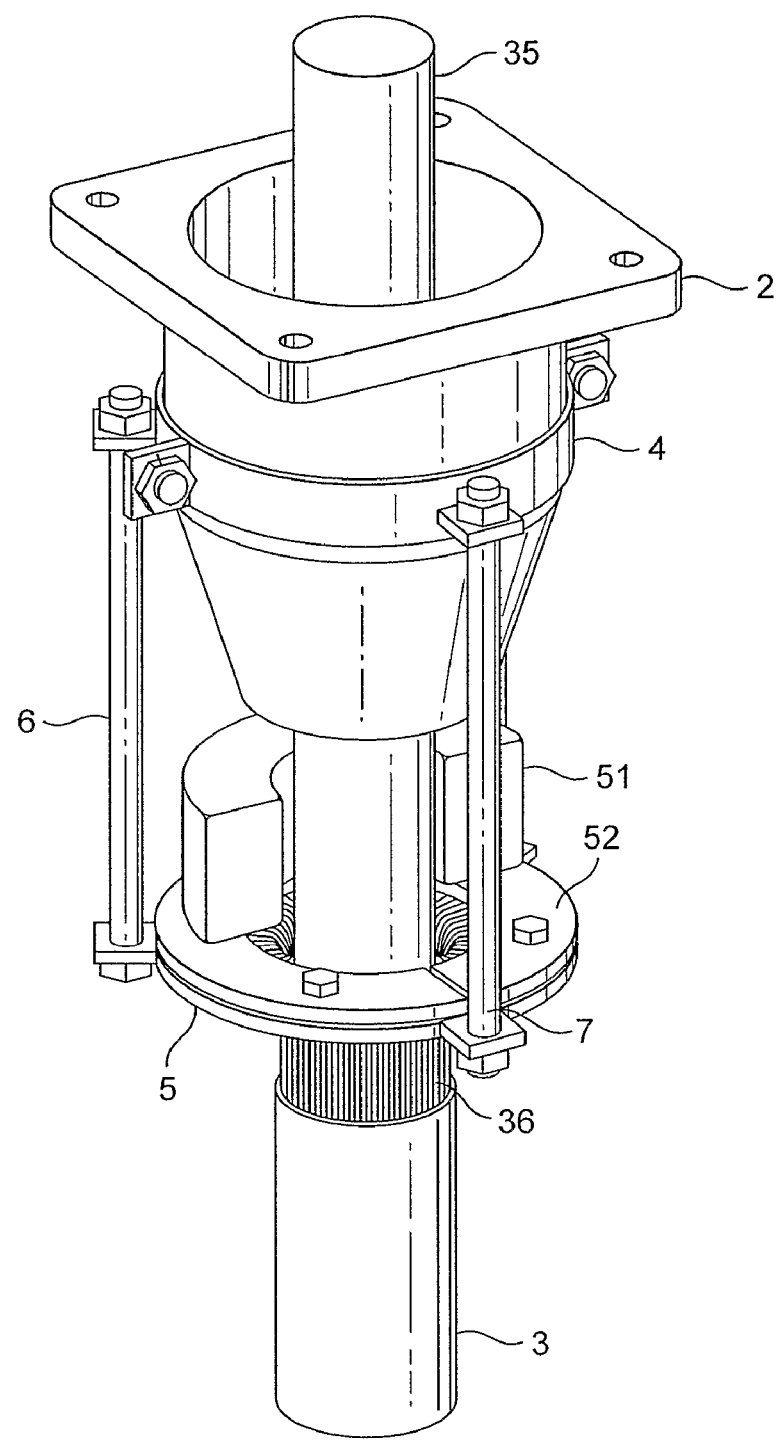
FIG. 5 shows the coupling arrangement of FIG. 1 with an inductive coil mounted therein.

The lead sheath 35 of the cable 3 is exposed between the gland clamp 4 and the armour clamp 5, and as shown in FIG. 5, an inductive coil 51 is placed around the exposed length of the sheath.

The arrangement shown in FIG. 5 is generally the same as that shown in FIG. 1 except that in this embodiment the connecting rods are formed of an electrically insulating material and the insulating elements 9 shown in FIG. 1 are therefore not required.

As shown in FIG. 5, an inductive coil 51 (only half of which is illustrated for clarity) is positioned on the upper horizontal surface 52 provided by the armour clamp 5. The inductive coil is thereby positioned adjacent to and coaxial with the lead sheath 35. The inductive coil is connected to known signal generating and/or decoding equipment (not shown) for generating the data signals which are to be injected and/or extracted to or from the cable 3. In particular, signals may be injected or extracted using either Time Division Multiplexing (TDM) or Frequency Division Multiplexing (FDM). Both of these techniques are well known in the data transmission art and do not need to be discussed further here. Preferably, however, TDM is used.

As mentioned above, the gland 2 and the lead sheath 35 of cable 3 are at the same electrical potential. The connecting rods 6, 7, 8 are electrically insulating, thereby ensuring that an earth path passes along the sheath 35 from the armour 36 through the centre of the inductive coil 51. To ensure proper operation of the inductor 51, a further earth path should be provided, e.g. by a copper bar 11 (FIG. 1) which also passes along the surface of the sheath 35 back from the gland 2 through the inductor 51 to the armour.

Figure 6:
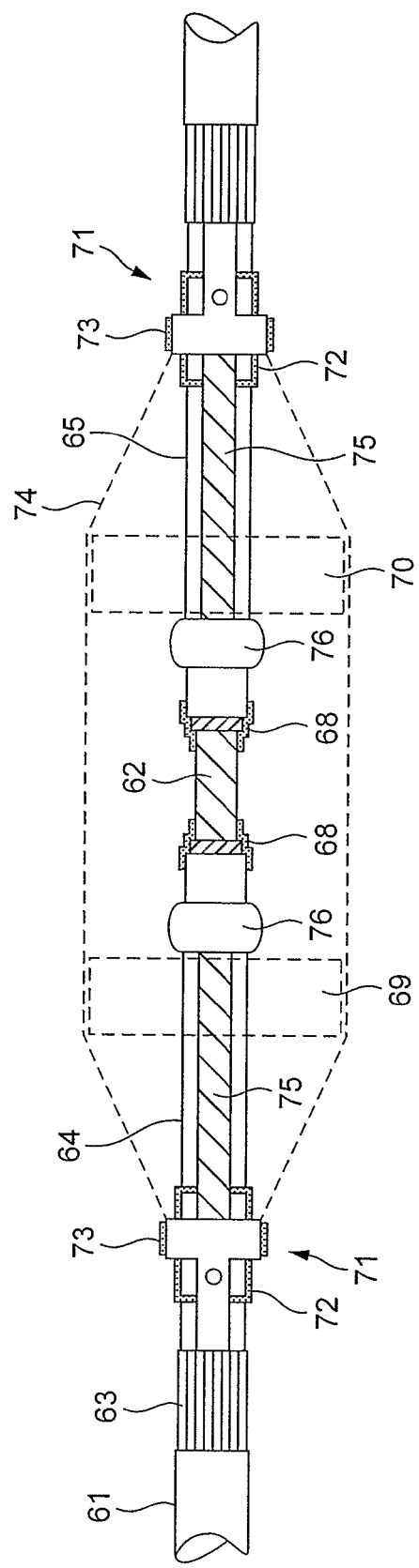
FIG. 6 shows, schematically, a repeater for use with a power line communication system.

FIG. 6 shows, schematically, a PLC repeater suitable for use with shielded electrical cables of the type already described above with reference to FIG. 3. The cable would typically connect one electricity sub-station to another on a medium voltage (1 IkV) distribution network. A repeater as shown in FIG. 6 would typically be placed at intervals along the length of the cable.

The central core 62 of the cable 61 remains uninterrupted such that electricity continues to be transmitted along the cable when the repeater is installed. In FIG. 6, the PLC signal propagates from left to right; i.e. the left of the cable can be considered to be the input and the right to be the output.

In the repeater, the armour 63 of the cable is terminated at a certain point to expose the underlying lead sheath 64, 65. The lead sheath 64, 65 is also cut away to expose a section of current carrying cores' insulation 62. The exposed lengths 64, 65 of lead sheath are provided with terminations 68 made from stress relieving tape arranged around the sheath termination point. Typically the tape would be a stress mastic tapes.

As shown, first and second inductive coils 69, 70 are arranged over the exposed lead sheath lengths 64, 65 on the respective ends of the repeater. The first inductive coil 69 is arranged to extract a data signal and the second inductive coil 70 is arranged to inject a data signal. The first and second inductive coils are electrically connected to a known PLC repeater circuit (not shown) which receives and amplifies the extracted signal from inductive coil 69 and feeds the amplified output to the second inductive coil 70 for injection back onto the cable 61. The data signal can thereby travel over extended distances using a series of repeaters disposed along the length of the cable. The data transmission, as in the earlier embodiment, preferably uses TDM or FDM techniques.

Now, respective collars 71 are mounted at one end of the respective exposed sheath lengths 64, 65. These collars 71 are connected electrically to the armour 63, but are insulated from the underlying lead sheath sections 64, 65 by insulators 72. The collars 71 mount, on their outer surfaces 73, an earth screen cage 74. This cage 74 is formed of a plurality of aluminum strips arranged around the cable or as a perforated sheet member. The cage 74 is at the same potential as the armour 63 as it is connected to the armour 63 through the collars 71. It is, however, insulated from the underlying sheath sections 64, 65.

However, an earth path is provided from the sheath sections 64, 65 to the cage 74 through respective insulated braids or cables 75 which are connected at one end; e.g. by solder 76 to the part of the sheath lengths 64, 65 beyond the coils 69, 70. The braids 75 pass under the coils 69, 70 and are affixed at their other ends to the collars 71, through which they are electrically connected to the cage 74. This arrangement thus provides a PLC repeater having an earth path between the input and output of the repeater which passes through each of the inductive coils, which is required for satisfactory extraction and injection of the signal.

The cage 74 may be encapsulated within a cover (not shown) which will prevent ingress of solids and moisture into the repeater.

What is claimed is:

1. An electrical system comprising an electrical apparatus and a shielded electrical cable connected to said apparatus, said cable having a core, a metallic sheath around the core and a surrounding armour; wherein said armour is disengaged from around said metallic sheath at a location where the sheath enters the apparatus, and is connected to and supported relative to said apparatus by means of a coupling such that a portion of the sheath is exposed between said location and the armour; and wherein said coupling comprising a first end arranged to receive the armour and a second end spaced from, but connected to, said first end, which second end is mounted to a part of the apparatus.

2. A system as claimed in claim 1, wherein said second end is configured to engage circumferentially around a part of the apparatus.

3. A system as claimed in claim 1, wherein the second end is formed as a collar, said collar comprising two or more components arranged to connect together.

4. A system as claimed in claim 1, wherein the second end is arranged to tighten around a part of the apparatus.

5. A system as claimed claim 1, wherein the first end of the coupling is arranged to clamp the cable armour between two surfaces.

6. A system as claimed in claim 5, wherein the surfaces are substantially parallel and arranged at an angle to the axis of the cable.

7. A system as claimed in claim 6, wherein the surfaces are perpendicular to the axis of the cable.

8. A system as claimed in claim 5, wherein the surfaces are in the form of two plates or discs provided with a central bore arranged to allow the core of the cable to pass therethrough.

9. A system as claimed in any of claim 8, wherein the connection member(s) is/are provided with means such that the first and second ends can be moved relative to one another along the axis of the cable.

10. A system as claimed in claim 9, wherein the first and second ends are moved relative to one another by means of a turnbuckle arrangement or arrangements.

11. A system as claimed in claim 8, wherein each plate or disc is formed of two or more components arranged to connect together to encircle the cable core and to co-operate so as to mechanically secure the cable armour.

12. A system as claimed in claim 11, wherein joins between respective plate or disc components are offset circumferentially from each other.

13. A system as claimed in claim 1, further comprising one or more connection member(s) extending between the first and second ends of the coupling.

14. A system as claimed in claim 13, wherein the connection member(s) is/are in the form of one or more rods.

15. A system as claimed in claim 13, comprising three circumferentially spaced connection members.

16. A system as claimed in claim 13, further comprising inductance means arranged around said exposed portion of said sheath.

17. A system as claimed in claim 16, wherein the inductance means is an inductive coil.

18. A system as claimed in claim 1, wherein the first end of the coupling is electrically insulated from the second end of the coupling.

19. A system as claimed in claim 1, wherein the first end of the coupling is arranged to provide a surface surrounding an exposed length of cable sheath for receiving an inductive component.

20. A system as claimed in claim 19, wherein the surface is perpendicular to the longitudinal axis of the cable.

21. A signal repeater comprising:
   an electrical cable comprising a current carrying core, a metallic sheath arranged around the core and armour around the metallic sheath, wherein:
      the armour is removed over a length of cable to expose a section of said metallic sheath; and
      a central part of said exposed section of metallic sheath is removed to expose a length of the core and to leave two lengths of sheath projecting from said armour;
   respective inductors arranged on said projecting lengths of sheath; and respective earth paths which run from respective end regions of said projecting lengths of sheath back under said inductors to an external earth path extending between both ends of the repeater, said earth paths being insulated from the respective lengths of sheath between the end region of the lengths of sheath and their connection to the external earth path.

22. A signal repeater as claimed in claim 21, wherein the inductors are coaxial with the cable.

23. A signal repeater as claimed in claim 21, wherein the earth path is provided by an insulated conductive braid connecting the end region(s) of the sheath and passing under the respective inductors.

24. A signal repeater as claimed in claim 21, wherein the external earth path is provided by one or more external conductive member(s).

25. A signal repeater as claimed in claim 24, wherein the external conductive member(s) is/are in the form of a conductive cage surrounding the cable.

* * * * *